(No Model.) 2 Sheets—Sheet 1.
T. H. BLAIR & J. H. CROWELL.
CAMERA SHUTTER.
No. 461,307. Patented Oct. 13, 1891.
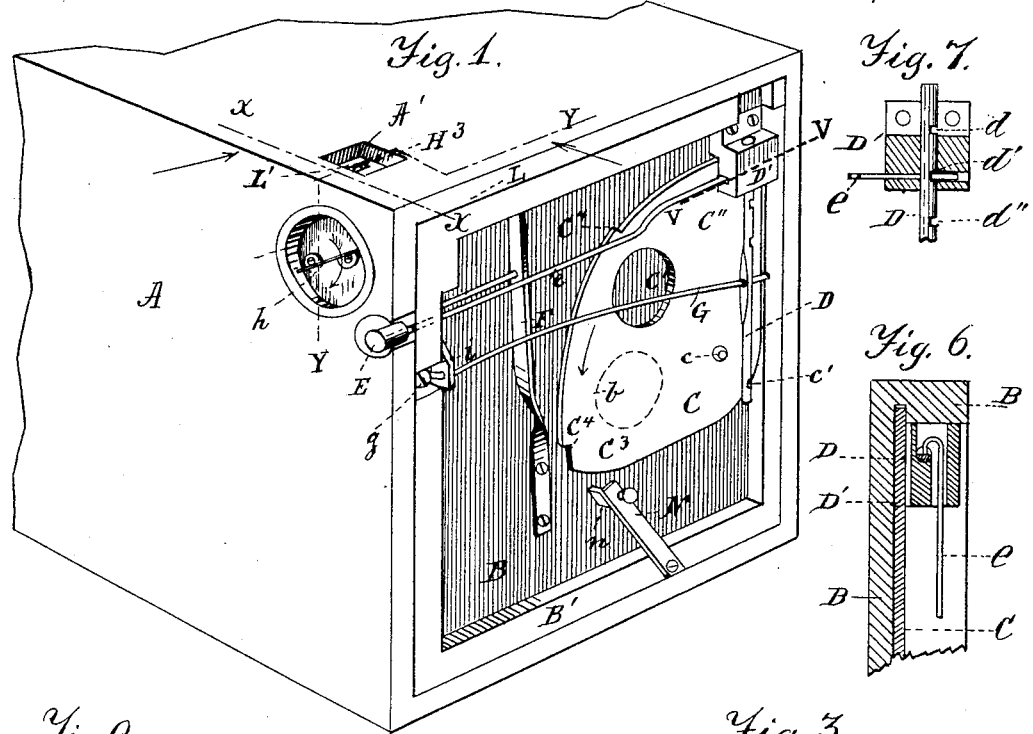
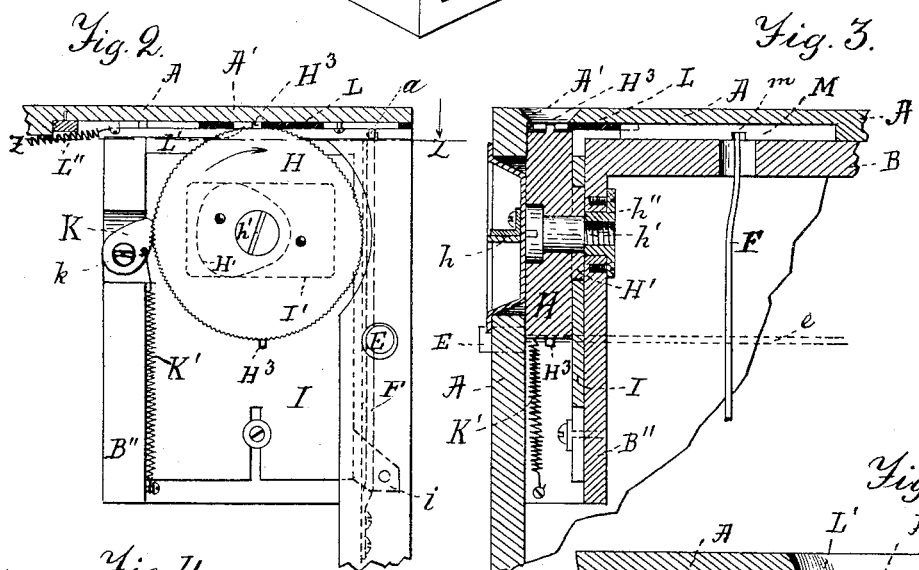
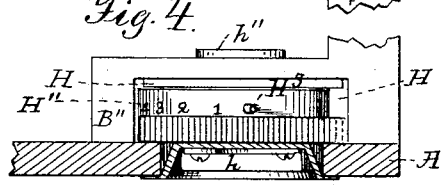
Witnesses:
Karl A. Andrén
M. A. Smith
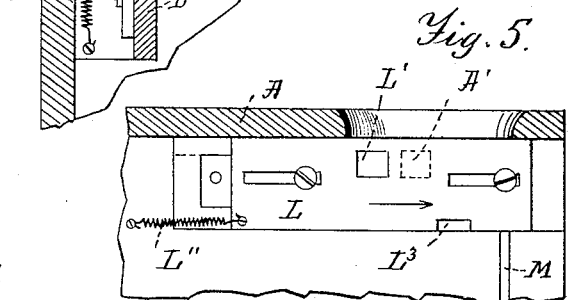
Inventors
Thomas H. Blair & John H. Crowell
by their atty.

(No Model.) 2 Sheets—Sheet 2.

T. H. BLAIR & J. H. CROWELL.
CAMERA SHUTTER.

No. 461,307. Patented Oct. 13, 1891.

UNITED STATES PATENT OFFICE.

THOMAS H. BLAIR, OF BOSTON, AND JOHN H. CROWELL, OF VINEYARD HAVEN, MASSACHUSETTS, ASSIGNORS TO THE BLAIR CAMERA COMPANY.

CAMERA-SHUTTER.

SPECIFICATION forming part of Letters Patent No. 461,307, dated October 13, 1891.

Application filed March 10, 1890. Serial No. 343,276. (No model.)

*To all whom it may concern:*

Be it known that we, THOMAS H. BLAIR, of Boston, Suffolk county, and State of Massachusetts, and JOHN H. CROWELL, of Vineyard Haven, in the county of Dukes and State of Massachusetts, both citizens of the United States, have jointly invented new and useful Improvements in Camera-Shutters, of which the following, taken in connection with the accompanying drawings, is a specification.

This invention relates to improvements in camera-shutters, and it is carried out as follows, reference being had to the accompanying drawings, wherein—

Figure 8:
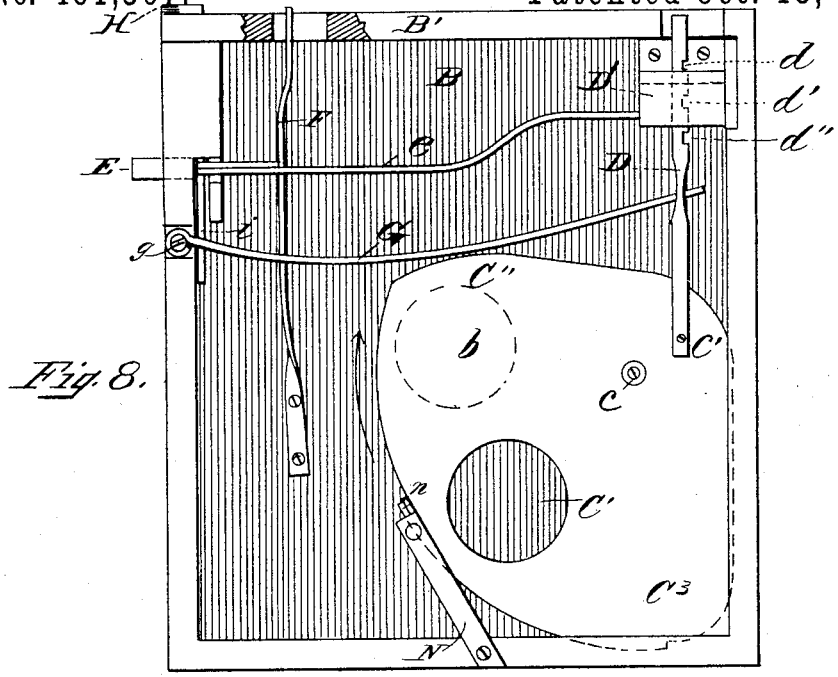
Figure 9:
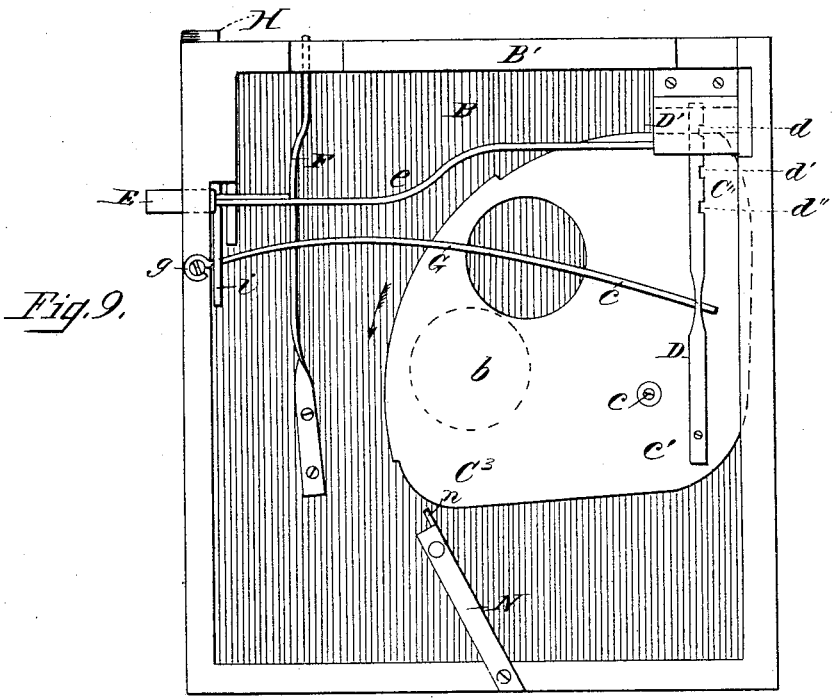

Figure 1 represents a perspective view of a camera provided with our improved shutter, the end plate of said camera being shown as removed in the figure. Fig. 2 represents an enlarged section on the line X X, shown in Fig. 1. Fig. 3 represents an enlarged section on the line Y Y, shown in Fig. 1. Fig. 4 represents a horizontal section on the line Z Z, shown in Fig. 2. Fig. 5 represents a detail interior view of the sliding plate for closing the sight-opening in the side of the camera at or about the time the shutter is released. Fig. 6 represents an enlarged cross-section on the line V V, shown in Fig. 1. Fig. 7 represents a detail sectional view of a part of the shutter-locking rod and its bearing; and Figs. 8 and 9 represent end views of the camera, showing the shutter respectively in its two opposite positions.

Similar letters refer to similar parts wherever they occur on the different parts of the drawings.

Camera-shutters are generally constructed in such a manner that after being released for the purpose of momentarily or otherwise exposing the sensitive plate it has been necessary to move or swing the shutter to its original position before it could again be operated, and this is objectionable, for the reason that unless an auxiliary shutter is employed inside of the camera-shutter or the camera end perforation or lens is closed while the shutter is moved to such original position the film or sensitive plate next to be exposed will be light-struck if the plate-holder slide is removed, and particularly so where roll-holders are used.

By the use of our invention we dispense with the capping of the lens or lens-perforation and auxiliary shutter as well as a slide for the holder, and in addition thereto several advantages are obtained, as will hereinafter be more fully shown and described.

In the drawings, A represents a portion of a camera-box, to the front end of which is secured, preferably in a detachable manner, the plate or diaphragm B, having an inclosing frame B', as usual.

$b$ (shown in dotted lines in Figs. 1, 8, and 9) is the lens-perforation in the plate B, back of which is secured the lens, as usual, the latter being, however, not shown in the drawings.

In practice the front end of the camera is closed by a cover having a perforation coinciding with that of the lens-opening $b$; but such cover is shown as removed in Fig. 1 for the purpose of more clearly illustrating the construction and operation of the improved shutter.

C is the shutter, which is pivoted at $c$ to the plate B and held in close contact to the latter with freedom to swing forward and back on its fulcrum when released from the spring by which it is actuated. Said shutter has a perforation C' about midway between its ends, and on either side of such perforation are the solid portions C'' and C³, as shown in Figs. 1, 8, and 9. During the reciprocating or oscillating motion of the shutter its perforation C' coincides with the lens-perforation $b$, so as to expose the sensitive plate or film for a longer or shorter period, as may be desired.

To the shutter C is connected at $c'$ the locking-rod D, having its free end preferably guided in a bearing D', secured to the plate B, as shown in Figs. 1, 8, and 9. $d$, $d'$, and $d''$ are locking notches or recesses on the rod D, adapted to receive the preferably hooked end of the spring-pressed trigger-rod $e$, having a trigger or button E projecting outside of the camera-box, as shown in Figs. 1, 3, 8, and 9, said trigger-rod being normally held in a locked position relative to the rod D by means of a spring F, secured to the plate B and pressing on an extension on the trigger E or its rod, as shown in Figs. 1, 8, and 9.

The shutter is actuated in two opposite directions by means of a spring bar or wire G, pivoted at g to the plate B, its frame B', or any other stationary part of the device, and said spring has its movable end pivoted or otherwise connected to the shutter-rod D, as shown in Figs. 1, 8, and 9. Thus if the spring G is sprung and held by the rod D in the position shown in Fig. 8 it will cause the shutter, when released by the trigger E, to swing in the direction shown by the arrow in said Fig. 8 until it reaches the position shown in Fig. 9, and vice versa. In conection with said spring-bar G we use a device for alternately forcing it to its two opposite positions for actuating the shutter, which device consists of a disk or plate H, having attached to its outside a suitable handle $h$, projecting through a side perforation in the camera-box, as shown in Figs. 1, 2, 3, and 4. Said disk is journaled on a screw or pin $h'$, secured in a suitable manner to the frame B' or a bracket B'' thereon, preferably by means of a nut or screw-threaded hub $h''$, as seen in Fig. 3. On the under side of the disk H is a cam or projection H', working in a slot or groove I' in the slide I, as shown in Figs. 2 and 3. The slide I is properly guided in said bracket B'', and it will thus be seen that a reciprocating motion is imparted to said slide by the rotation of the disk H. The slide I has a perforated side projection $i$, through which the spring-rod G passes loosely, as shown in Figs. 1 and 2, and by this arrangement the wire G is sprung alternately to the positions shown in Figs. 8 and 9 by the rotation of the disk H in the direction shown by arrows in Figs. 1 and 2. The disk H is prevented from being turned in an opposite direction by means of the clutch or pawl K, pivoted at $k$ and actuated by a suitable spring K'. (Shown in Fig. 2.) If so desired, the periphery of the disk H may be serrated where it engages with the yielding pawl K; but this is not essential.

It is desirable that the speed of the shutter should be variable according to the nature or luminosity of the object that is to be photographed, or according to the degree of sensitiveness of the plate or film, and for this purpose an index H'' (marked "1," "2," "3," and "4") is made on the periphery of the disk H, or in a similar manner, as shown in Fig. 4. A similar index is made on the periphery of the disk H, diametrically opposite to the one shown in Fig. 4, and said indexes may be ascertained through a perforation A' in the wall of the camera-box A, as shown in Figs. 1, 2, and 3. Thus, for instance, if a comparatively slow motion is to be imparted to the shutter the disk H is moved so as to bring the index-figure "1" directly below the opening A', causing a comparatively low tension to be given to the spring G, and by pushing the trigger E a corresponding slow motion will be given to the shutter. If the shutter is to be operated with a quicker motion, the disk H is turned always in the same direction until the index-figures "2," "3," or "4" are in sight, causing a correspondingly-increased tension to be given to the spring-rod G, which, when released, will cause the shutter to move with a correspondingly-increased speed.

In connection with the rotary disk H and the perforation A' in the camera-box A we use a sliding gate-plate L (shown in Figs. 2, 3, and 5) for the purpose of automatically closing the said opening A' as soon as the trigger is pushed for releasing the shutter in making an exposure, and thereby indicating to the operator that the tension on the spring G is released and that it is necessary to turn the disk H more or less around its axis to make another exposure. Said gate L is guided on the inside of the camera-box A and has a perforation L', adapted to coincide with the box-perforation A' when the shutter is set for action. The said gate L is normally held in a closed position relative to the box-perforation A' by means of a suitable spring L''. (Shown in Fig. 5.)

$H^3$ $H^3$ are diametrically-arranged projections on the periphery of the disk H, (shown in Figs. 2, 3, and 4,) which during the rotation of the said disk are alternately caused to enter the gate-perforation L', and by coming in contact with the forward edge thereof cause the gate L to be moved in the direction of the arrow shown in Fig. 5, and during such motion of the gate a spring-pressed lock-bar M is caused to enter a notch $L^3$ in the edge of the gate L, so as to hold it in an open position relative to the box-perforation A' after the disk projection $H^3$ has passed by the edge of the gate-perforation L'.

The spring for actuating the lock-bar M is the trigger-spring F, the end of which is suitably connected to said lock-bar, preferably by being made to rest in a notch $m$ in the latter, as shown in Figs. 3 and 5. It will thus be seen that the spring F serves two purposes—namely, to hold the trigger E in its normal position, as well as to hold the gate L open after the spring-bar G is set and until the shutter is released by pressing the trigger. In pressing the trigger while in the act of releasing the shutter the lock-bar M is disengaged from the notch $L^3$ in the gate L, and the latter is instantly moved by its spring in the opposite direction to that shown by the arrow in Fig. 5, causing the gate-perforation L' to pass by the box-perforation A', as shown in Fig. 5, thus indicating to the operator that the disk H must be turned the desired distance to give the tension to the spring G before the shutter can again be operated.

For the purpose of making "time exposures" a spring-bar N is secured to the frame B' or any other stationary part of the plate B or camera-box, which bar has in its inner free end a tooth or projection $n$, adapted when depressed to be held in contact with either one of the projections $C^4$ $C^4$ on the periphery of the shutter, as shown in Figs. 1, 8, and 9.

In making a time exposure the disk H is turned until the figure "1" is in sight below the camera-perforation A', after which the inner end of the spring-bar N is depressed, and while being held in such position the trigger E is pressed inward, causing the shutter to be released and swung by the influence of its spring in the direction of arrow shown in Fig. 1 until the shutter projection $C^4$ is brought in contact with the spring projection $n$, in which position the lens-opening is still kept closed by the solid portion of the shutter. The trigger E is then released, after which the pressure on the spring-bar N is likewise released, allowing the shutter to be swung in the same direction until its perforation coincides with the camera-lens perforation, in which position the shutter will be held by the hooked end of the bar $e$ engaging with the middle notch $d'$ in the rod D, and in such open position the shutter may be held for any length of time exposure desired, at the end of which the shutter is closed by pressing the trigger E, by which the rod D is liberated from the hooked end of the rod $e$, causing the shutter to be closed by the action of the spring G.

It will thus be seen that with our improved shutter an exposure can be made by moving the shutter in any one of two opposite directions without the need of first returning it to a constant or normal single starting position, as is the case with camera-shutters of other constructions. A reciprocating motion is imparted to the shutter by means of a disk always turned in the same direction. A scale or index is made on said disk to ascertain and set the shutter-spring for the desired closing speed, and a gate is provided for the camera-opening to close the latter when the exposure is made for the purpose described, and a means is provided for making time exposures, as above specified.

Having thus fully described the nature, construction, and operation of our invention, we wish to secure by Letters Patent and claim—

1. A camera-shutter having a perforation for exposing the camera-lens opening and solid portions on two opposite sides thereof for closing the same, a double-acting spring for moving the shutter in two opposite directions, a notched locking-bar connected to said spring and shutter, and a spring-pressed releasing-trigger, substantially as and for the purpose set forth.

2. A camera-shutter having a perforation for exposing the camera-lens opening and solid portions in two opposite sides thereof for closing the same, a double-acting spring for moving the shutter in two opposite directions, a notched locking-bar connected to said spring and shutter, and a yielding stop-lever adapted to rest against one of two projections on the shutter for making time exposures, substantially as specified.

3. A camera-shutter adapted to be moved in two opposite directions and having a double-acting spring, a locking device, and a trigger for its operation, combined with a rotary disk and a reciprocating slide actuated by it and connected to the double-acting spring for the purpose of bending the latter in either of its two opposite positions by rotating said disk in one and the same direction, substantially as specified.

4. A camera-shutter adapted to be moved in two opposite directions and having a double-acting spring, a locking device, and a trigger for its operation, combined with a rotary disk, a slide operated by the latter and connected to the spring, and a clutch or binder for preventing the said disk from being rotated in more than one direction, substantially as and for the purpose set forth.

5. A camera-shutter adapted to be moved in two opposite directions and having a double-acting spring, a locking device and a trigger for its operation, a rotary disk, and a reciprocating slide for actuating said spring, combined with the camera-wall having a perforation, and a perforated slide or gate adapted to be closed by the release of the trigger, substantially as specified.

6. A camera-shutter adapted to be moved in two opposite directions and having a double-acting spring, a locking device and spring-pressed trigger for its operation, and a rotary indexed disk and connecting mechanism to the shutter-spring, as described, combined with a camera-wall having a perforation and a sliding perforated gate adapted to be opened by the movement of the rotary index-disk and to be held in such open position by means of a spring-pressed locking-bar and returned to its closed position by the release of the trigger, substantially as and for the purpose set forth.

In testimony whereof we have signed our names to this specification, in the presence of two subscribing witnesses, on this 26th day of February, A. D. 1890.

THOMAS H. BLAIR.
JOHN H. CROWELL.

Witnesses:
ALBAN ANDRÉN,
LILLIAN MAE HOLLAND.